Nov. 11, 1958  K. F. RENTSCHLER  2,859,674
PHOTOGRAPHIC SHUTTER FOR STEREOSCOPIC CAMERAS
Filed Aug. 19, 1954
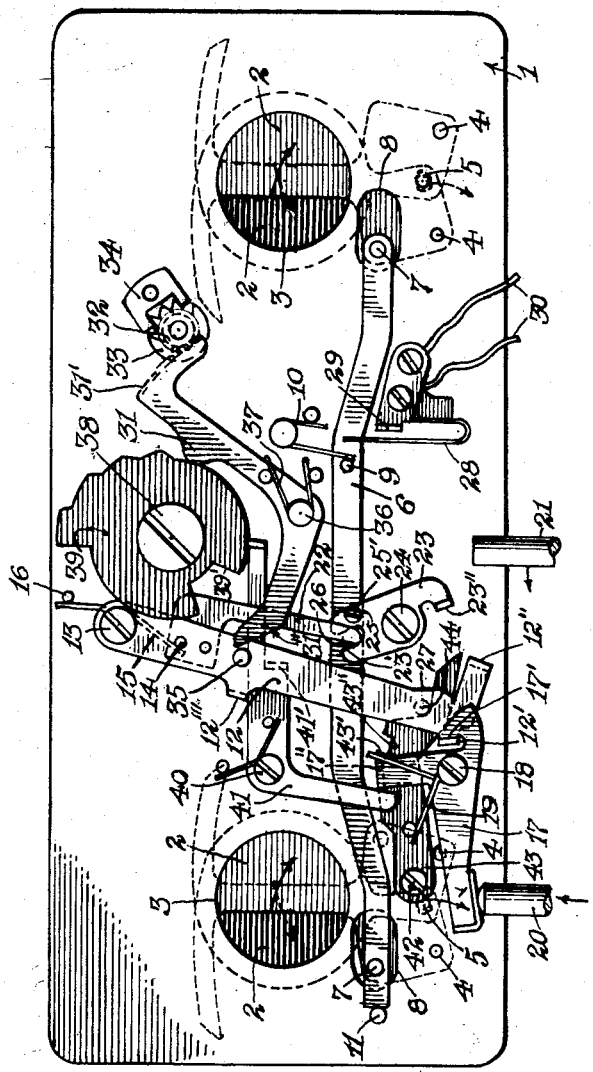
INVENTOR
Karl F. Rentschler
BY
Mums, Liddy, Hathanson & March
ATTORNEYS

United States Patent Office 2,859,674
Patented Nov. 11, 1958

2,859,674

PHOTOGRAPHIC SHUTTER FOR STEREO-SCOPIC CAMERAS

Karl F. Rentschler, Calmbach (Enz), Germany, assignor to Alfred Gauthier G. m. b. H., Calmbach (Enz), Germany, a corporation of Germany Application August 19, 1954, Serial No. 451,016

Claims priority, application Germany March 24, 1954

7 Claims. (Cl. 95—11.5)

This invention relates to a photographic shutter mechanism for a stereoscopic camera having two intercoupled lens shutters.

It is one of the objects of the present invention to provide a stereoscopic shutter mechanism characterized by a number of shutter speeds, and which also provides for flash synchronization without necessitating any complicated construction.

According to the present invention a photographic shutter mechanism is provided for a stereoscopic camera having two intercoupled lens shutters, wherein said mechanism includes a main driving lever which is operated by a main shutter operating spring, and which lever is located in the space between the two shutters and is provided with a resilient part or arm through which the movement of said lever is transmitted to the shutters.

The aforesaid main driving lever may advantageously cooperate with a two-armed, forked shift lever which is cooperatively positioned in the path of movement of the driving lever and which serves for transmitting the movement of the driving lever to a connecting member in the form of a push rod or link bar connecting the two shutters, said shift lever carrying on one of its arms a coupling element or camming projection which is effective only in one direction.

For producing a simple and accurate synchronization of a flash-gun and the two shutters, the actuating element for closing a flash contact switch may be mounted on the aforesaid connecting member or link bar connecting the two shutters.

An advantageous space arrangement may be provided in the design of the shutter owing to the fact that an escapement serving for producing a number of shutter speeds may also be arranged in the space between the two shutters. The space arrangement affords the additional advantage of the use of a control cam disc for adjusting the shutter speeds with the axis of the cam disc arranged centrally and above the two shutters. Such arrangement of the control cam disc makes it possible for its cooperation with the escapement arranged in a very convenient manner and, furthermore, ready access to the cam disc for adjustment purposes is obtained. Also by virtue of the arrangement of the cam disc, the further possibility is obtained for providing the cam disc shaft with an extension passing through the front wall of the camera housing. An actuating element or knob then may be mounted on said extension without the interposition of any supplementary connecting members and enabling the setting of the shutter speeds to be accomplished at a centrally disposed main viewing position on the front of the camera.

The present invention, in one embodiment thereof, will now be described with reference to the accompanying drawing in which the single figure is a side view showing an assembly plate on which parts of the shutter are mounted.

In the drawing there is shown a combined cover and assembly or base plate 1 of a two shutter stereoscopic camera. An additional plate which is not shown but which is of the same size as the plate 1 is arranged adjacent the latter. Blades 2 of each of two lens shutters operate in the space between the two plates. The shutter blades are shown in their closed positions in which they close the light apertures 3. The blades 2 are pivoted on the plate 1, as at 4, and the blades of each shutter are pivotally connected to each other, as at 5.

The coupling together of the two lens shutters is effected by a linkage means comprising a connecting or push rod 6 hereinafter also termed a "link bar" whose opposite ends respectively are pivotally connected to one blade of each of the two shutters by pivot pins 7 which project through slots 8 respectively in the plate 1. The movement of the rod 6 in the direction from left to right causes the simultaneous opening of both shutters by reason of the connections provided by the pins 7 and the connections 5 between the blades of each of the two shutters. The connecting rod 6 is biased to the left by a spring 10 mounted on the plate 1 and having one end in engagement with a pin 9 on the rod 6 so as to hold the blades of the shutters closed. A pin 11 on the plate 1 serves as a stop to limit the movement of the rod 6 to the left.

A main lever 12 which is fulcrumed as at 13 on the base plate 1 is located between the shutter apertures 3. A main spring 15 of the shutter assembly is carried by the fulcrum 13 with one end acting on a pin 14 on the lever 12 and the other end of the spring bearing on an abutment 16 on the plate 1. The lever 12 is shown in its stressed or cocked position in the drawing. It is held in this position by a locking lever or trigger 17 fulcrumed as at 18 on the plate 1. The lever or trigger 17 by means of a projection 17' thereon engages behind a laterally projecting lug 12' on the lever 12. A pivotal movement of the lever 17 in a clockwise direction and against the action of a spring 19 frees the lever 12 and allows it to pivot in a counterclockwise direction under the action of the main spring 15, the main lever 12 being movable in a path parallel to the base plate 1 and loose movement of the lever laterally of the plate being prevented by the pivot 13. The spring 19 is carried by the fulcrum 18 with one end bearing on an arm 17" of the lever 17 and the other end bearing on a pin on a locking lever 43 whose purpose will be explained hereinafter. The lever 17 is actuated by means of a release member or button 20 while the movement of the main lever 12 from the unstressed position of the spring to the stressed position thereof is caused by a slide member 21 acting on an arm 12" on the main lever 12. In the drawing the slide member 21 is shown in its normal position of rest.

The main lever 12 has secured thereto one end of a flexible and resilient part or arm 22 by means of which the lever 12 cooperates with a two-armed shift lever 23 fulcrumed as at 24 on the plate 1. The lever 23 is referred to herein as included in the linkage means by which the both shutters may be actuated, being arranged in the path of pivotal movement of the main lever 12 and when acted on by the latter serving to effect the reciprocatory movement of the rod 6 to operate the two shutters.

In order to cause the cooperation of the lever 12 and the lever 23 the latter has a clutch member or projection 25 thereon which is only operative in one direction for the purpose of moving the rod 6 to the right. The member 25 is in the form of a pin projecting from the lever 23 and is bevelled to the right to provide a cam surface 25'. During the counterclockwise movement of the lever 12 the arm 22 bears on the cylindrical surface of the pin member or projection 25 and causes the lever 23 to turn in a clockwise direction. The lever 23 embodies a fork 23' which coacts with a pin 26 on the rod 6 in the clockwise movement of the lever 23, forming a driving connection therewith, and as a result the rod 6 is caused to move from the left to the right which causes the shutter blades to open. As the lever 12 continues to move in a counterclockwise direction a control edge or abutment 27 on the lever 12 strikes a laterally projecting lug or cooperable abutment 23" on the lever 23 which is then caused to move counterclockwise, and this causes the two shutters to close again.

As the main lever 12 returns from its unstressed position which it reaches after completing the closing movement of the shutters, to the stressed or cocked position shown in the drawing, it does not affect the lever 23 because the arm 22 rides inoperatively over the cam surface 25' and springs at the end of its movement behind the pin member or projection 25. The effective length of the arm 22, as compared with the distance between the mounting of the arm on the lever 12 and the pivot 13 of the lever is relatively great, thereby minimizing undesired lateral movement of the lever in directions normal to the plate 1, and minimizing the likelihood of misalignment of the abutments 27 and 23".

For the purpose of synchronizing the operation of the shutters and a flash-gun, the plate 1 has mounted thereon a contact switch which consists of a contact spring 28 and an opposing contact 29 insulated from said spring 28. Wires 30 lead to suitable means for establishing electrical connection with a flash-gun.

The actuation of the flash contact switch is effected by means on the rod 6, and in the present instance it is done by the pin 9 on the rod 6. The pin 9 flexes the contact spring 28 into engagement with the contact 29 in the movement of the rod 6 to the right thereby closing a circuit through the flash-gun upon the full opening of the shutter apertures 3. It will therefore be evident that the provision and arrangement described provides a flash synchronizing mechanism which operates reliably and which at the same time is very simple.

For producing different shutter speeds, an escapement or timing mechanism is arranged in the space between the two shutter apertures 3. The escapement comprises a two-armed brake or timing lever 31 which has a toothed segment 31', a pinion 32, a pallet wheel 33 and a pallet 34. The escapement becomes operative when a pin 35 fixed to the lever 12 engages an inclined surface 31" on the timing lever 31. This causes a clockwise movement of the lever 31 on its fulcrum 36 against the action of a return spring 37 of the lever 31. In this manner the counterclockwise movement of the lever 12 is retarded by the action of the escapement.

The degree of retardation of the lever 12 depends upon the initial position of the lever 31. This initial position is determined by a control cam disc 39 rotatable on a pin 38 on the plate 1. The pin 38 is located on a line perpendicular to and midway of a line passing through the centers of the apertures 3. This arrangement offers the particular advantage that an extension may be mounted on the pin 38 passing through the front wall of the camera housing. Such extension may have fitted thereon a control element or knob by means of which the setting of the shutter speeds may be effected at a centrally disposed point which is in the main viewing position on the front wall of the camera. This advantage is attained without the interposition of any special connecting elements between the control cam disc 39 and the actuating element on the front of the camera.

In addition to the parts which already have been described, the stereoscopic shutter of the present invention includes a bellcrank lever 41, hereinafter also called a bulb lever, fulcrumed as at 40 on the plate 1. The lever 41 cooperates with a notch 39' in the disc 39 and also cooperates by means of its lug or abutment 41' with a laterally disposed arm or abutment 12''' on the lever 12. This, in a manner known per se, enables the shutters to be held in the open position for any required length of time, after the apertures 3 have been fully uncovered, by holding the lever 12 for bulb exposures.

Also there is provided the aforesaid lever 43 which prevents the operation of the release button 20 when the shutter is not set. The lever 43 is of the one-arm type and is fulcrumed on the plate 1 as at 42. In the unset position of the shutter, the arm 17" of the lever 17 is locked by a stepped edge 43'. The release of this locking action is effected on setting the lever 12 by rocking the lever 43 clockwise. A pin 44 on the lever 12 acting on the lever 43 causes it to rock as stated.

In order to provide a shutter with a minimum of parts, the lever 43 embodies a second step 43" which serves as a stop to limit the clockwise movement of the lever 17. This eliminates the use of a separate element as a stop for the lever 17.

From the foregoing it will be apparent that the present shutter mechanism for a stereoscopic camera is of simplified construction in general; that it is of improved efficiency and convenience in handling; and that it makes possible the practice of simple methods of manufacture of the separate parts and their assembly to produce a complete camera.

I claim:

1. A photographic shutter mechanism for a camera, comprising a base plate; a lens shutter movably mounted on the base plate; linkage means mounted on the base plate for movement between two positions and connected to said shutter, to actuate the same, said linkage means having a projection provided with a driving face by which it is operated, said projection being further provided with a cam surface which is non-parallel to said driving face; a main, spring-charged lever at one end pivotally mounted on the base plate and movable in a path substantially parallel to the plate between cocked and uncocked positions, the pivotal mounting for the lever restricting loose movement thereof laterally of the plate; a trigger movably mounted on the base plate and cooperable with the said main lever for releasably holding the same in cocked position; an elongate, resilient and flexible arm at one end fixedly secured to the main lever adjacent the pivotal mounting thereof to move therewith, the other end of said flexible arm being engageable with the driving face of the projection of the linkage means to drive the same and the linkage means for opening of the shutter upon release of the main lever from cocked position, said flexible arm being adapted to bypass said projection after driving it, and upon return movement of the main lever being adapted to engage the cam surface of the projection and to be shifted laterally thereby so as to ride over and bypass the projection; and means for reversely driving said linkage means by said main lever prior to its said return movement and after said arm bypasses the said projection.

2. The invention as defined in claim 1 in which there is a second lens shutter movably mounted on the base plate and spaced apart from said first lens shutter to provide for the taking of stereo pictures, in which there is a second linkage means connected to said first-mentioned linkage means for causing simultaneous actuation of both shutters, both said linkage means including an elongate link bar extending substantially parallel to the plate, in which the main lever is disposed virtually perpendicular to said link bar adjacent the center thereof, in which there is a settable cam disc rotatably carried by the base plate at a point equispaced from and between the said lens shutters, and in which there is a timing mechanism including a timing lever pivoted on the base plate and engageable with said cam disc, said timing lever having a portion disposed in the path of and engageable by the main lever to control the movement thereof.

3. The invention as defined in claim 2 in which there is a bulb lever pivoted on the base plate at a point disposed between the said shutters and engageable with said cam disc for control thereby, said bulb lever and main lever having cooperable abutments adapted to engage each other in response to a predetermined setting of the cam disc and bulb lever, to limit movement of the main lever.

4. The invention as defined in claim 2 in which there is a resilient electrical contact spring carried by the base plate, in which there is a fixed contact on the base plate engageable by said spring when the latter is flexed, and in which there is an abutment on the link bar, engageable with said contact spring for flexing the same to engage it with the fixed contact and thereby control a flash bulb circuit.

5. The invention as defined in claim 1 in which the effective length of the resilient arm from its point of securement to its said other end is greater than the distance from the pivotal mounting of the main lever to the point of securement of said arm to said lever.

6. The invention as defined in claim 1 in which the linkage means includes a push-rod connected to the shutter and a two-armed lever pivoted on the base plate and having a driving connection with the push-rod, the said projection with the cam surface being carried by one arm of said two-armed lever, and in which there are cooperable engageable abutment means on the other arm of the two-armed lever and on the free extremity of the main lever, for causing reverse movement of the two-armed lever and push-rod for closing the shutter prior to termination of movement of the main lever from its cocked position, said abutment means comprising portions of the levers, disposed in a plane substantially parallel to the base plate.

7. The invention as defined in claim 1 in which there is a resilient electrical contact carried by the base plate, in which there is a fixed contact on the base plate engageable by said resilient contact, and in which there are means on said linkage means, for engaging and actuating said resilient electrical contact to engage the same with the fixed contact and thereby control a flash bulb circuit.

References Cited in the file of this patent

UNITED STATES PATENTS

| | | |
|---|---|---|
| 471,088 | Anthony et al. | Mar. 22, 1892 |
| 1,032,297 | Richard | July 9, 1912 |
| 2,176,621 | Brueck | Oct. 17, 1939 |
| 2,279,477 | Mihalyi | Apr. 14, 1942 |
| 2,331,568 | Perwitz | Oct. 12, 1943 |
| 2,453,180 | Bachelder et al. | Nov. 9, 1948 |
| 2,505,140 | Peltz et al. | Apr. 25, 1950 |

FOREIGN PATENTS

| | | |
|---|---|---|
| 430,294 | Germany | June 14, 1926 |